(12) United States Patent
Doleac et al.

(10) Patent No.: US 8,703,219 B2
(45) Date of Patent: Apr. 22, 2014

(54) CAPSULE FOR PREPARING A NUTRITIONAL PRODUCT INCLUDING A FILTER

(75) Inventors: Frederic Doleac, Vaux et Chantegrue (FR); Sophie Abraham, Malbuisson (FR); Yasmine Doudin, Vallorbe (CH); Yann Epars, Penthalaz (CH); Thierry Jean Robert Fabozzi, Geneva (CH); Heinz Wyss, Oberdiessbach (CH); Nicolas Bezet, Macon (FR); Lucio Scorrano, Yverdon-les-Bains (CH); Nihan Dogan, La Croix-sur-Lutry (CH); Alain Meier, Caneggio (CH)

(73) Assignee: Nestec S.A., Vevey (CH)

( * ) Notice: Subject to any disclaimer, the term of this patent is extended or adjusted under 35 U.S.C. 154(b) by 35 days.

(21) Appl. No.: 13/318,981

(22) PCT Filed: May 4, 2010

(86) PCT No.: PCT/EP2010/056005
§ 371 (c)(1),
(2), (4) Date: Nov. 4, 2011

(87) PCT Pub. No.: WO2010/128031
PCT Pub. Date: Nov. 11, 2010

(65) Prior Publication Data
US 2012/0052163 A1  Mar. 1, 2012

(30) Foreign Application Priority Data

May 5, 2009 (EP) .................................... 09159373
Jun. 11, 2009 (EP) .................................... 09162485

(51) Int. Cl.
*B65B 29/02* (2006.01)
*B65B 29/06* (2006.01)
*A47J 31/06* (2006.01)
*B01D 63/00* (2006.01)
*B01D 27/08* (2006.01)

(52) U.S. Cl.
USPC ................................ 426/77; 426/115; 99/295

(58) Field of Classification Search
USPC .......... 426/77, 78, 79, 112, 115, 394; 99/295, 99/301, 323; 210/321.75, 289, 445, 455
See application file for complete search history.

(56) References Cited

U.S. PATENT DOCUMENTS

| 663,271 A | 4/1900 | Hamilton |
| 3,730,353 A | 5/1973 | Trasen et al. |

(Continued)

FOREIGN PATENT DOCUMENTS

| CN | 2036061 U | 4/1989 |
| CN | 2436167 Y | 6/2001 |

(Continued)

OTHER PUBLICATIONS

Webster's Definition of "nozzle" and "spout." 1998, Simon & Schuster.*

(Continued)

*Primary Examiner* — Viren Thakur
(74) *Attorney, Agent, or Firm* — Winston & Strawn LLP (57) ABSTRACT

Capsule for the preparation of a nutritional product in a device adapted to supply liquid in the capsule, said capsule comprising: at least one compartment (13) containing nutritional ingredients for the preparation of the nutritional product in combination with the supplied liquid, a filter (18) adapted for removing contaminants contained in the liquid, wherein the filter (18, 20) has a filtering surface (F) smaller than the cross section (C) of the compartment and at least a part of its filtering surface (F) is preferably offset relative to the cross section (C) of the compartment when viewed in the axial projection of the capsule.

16 Claims, 9 Drawing Sheets

(56) References Cited

U.S. PATENT DOCUMENTS

| | | | |
|---|---|---|---|
| 4,136,202 A | 1/1979 | Favre | 426/77 |
| 4,500,426 A | 2/1985 | Ishii et al. | |
| 4,867,876 A * | 9/1989 | Kopf | 210/228 |
| 5,011,555 A * | 4/1991 | Sager | 156/73.1 |
| 5,186,830 A * | 2/1993 | Rait | 210/232 |
| 5,510,027 A | 4/1996 | Tejeda | |
| 5,681,468 A * | 10/1997 | Sawan et al. | 210/500.25 |
| 6,103,116 A | 8/2000 | Koslow et al. | |
| 6,245,230 B1 * | 6/2001 | Ricci | 210/232 |
| 6,312,609 B1 * | 11/2001 | Solyanik et al. | 210/767 |
| 6,599,428 B1 * | 7/2003 | Douglas | 210/668 |
| 6,805,041 B2 * | 10/2004 | Colston et al. | 99/295 |
| 6,955,700 B2 * | 10/2005 | Zia et al. | 55/495 |
| 2002/0059870 A1 * | 5/2002 | Walters, Jr. et al. | 99/298 |
| 2004/0005384 A1 | 1/2004 | Cai | |
| 2004/0228955 A1 | 11/2004 | Denisart et al. | 426/590 |
| 2007/0144355 A1 | 6/2007 | Denisart et al. | |
| 2007/0148290 A1 | 6/2007 | Ternite et al. | 426/90 |
| 2007/0186784 A1 * | 8/2007 | Liverani et al. | 99/295 |
| 2007/0199888 A1 | 8/2007 | Japp et al. | 210/474 |
| 2007/0259073 A1 * | 11/2007 | Scarchilli et al. | 426/78 |
| 2008/0035550 A1 * | 2/2008 | Fecondini et al. | 210/282 |
| 2008/0257165 A1 | 10/2008 | Bolzicco et al. | 99/295 |
| 2009/0004335 A1 | 1/2009 | MacMahon et al. | |
| 2009/0047389 A1 | 2/2009 | Jarisch et al. | 426/80 |
| 2009/0126578 A1 | 5/2009 | Amann et al. | |
| 2009/0155422 A1 | 6/2009 | Ozanne | 426/89 |
| 2010/0108541 A1 | 5/2010 | Roberto | 206/0.5 |
| 2012/0052159 A1 | 3/2012 | Doleac et al. | 426/79 |
| 2012/0052164 A1 | 3/2012 | Doleac et al. | 426/112 |

FOREIGN PATENT DOCUMENTS

| | | |
|---|---|---|
| CN | 1826071 A | 9/2006 |
| DE | 102005058336 A1 | 6/2007 |
| EP | 1364605 A1 | 11/2003 |
| EP | 1 574 452 A2 | 9/2005 |
| EP | 1 774 878 A1 | 4/2007 |
| EP | 1 826 148 A1 | 8/2007 |
| EP | 1500358 B1 | 9/2007 |
| EP | 1 980 501 A1 | 10/2008 |
| EP | 1 982 933 A1 | 10/2008 |
| EP | 2082670 A1 | 7/2009 |
| EP | 2 236 437 A1 | 10/2010 |
| EP | 2244593 A1 | 11/2010 |
| EP | 2244743 A1 | 11/2010 |
| EP | 2285256 A1 | 2/2011 |
| EP | 2299851 A1 | 3/2011 |
| EP | 2194824 61 | 9/2011 |
| EP | 2230973 B1 | 10/2011 |
| EP | 2427065 B1 | 12/2012 |
| WO | WO 01/51166 A1 | 7/2001 |
| WO | WO 2005/080223 A1 | 9/2005 |
| WO | WO2006043108 A1 | 4/2006 |
| WO | WO 2006/077259 A1 | 7/2006 |
| WO | WO2007125337 A1 | 11/2007 |
| WO | WO 2008/012314 A1 | 1/2008 |
| WO | WO2008078989 A1 | 7/2008 |
| WO | WO 2008/132571 A1 | 11/2008 |
| WO | WO 2008/148834 A1 | 12/2008 |
| WO | WO 2008146115 A1 * | 12/2008 |
| WO | WO2008147195 A1 | 12/2008 |
| WO | WO2009027131 A1 | 3/2009 |
| WO | WO 2009/092629 A1 | 7/2009 |
| WO | WO2009092628 A1 | 7/2009 |
| WO | WO2009092774 A1 | 7/2009 |
| WO | WO 2009/115475 A1 | 9/2009 |
| WO | WO2009135177 A1 | 11/2009 |
| WO | WO2010003878 A1 | 1/2010 |
| WO | WO2010128028 A1 | 11/2010 |

OTHER PUBLICATIONS

"USDA National Nutrient Database" Apr. 3, 2009 http://web.archive.org/web/20090104004513/http://www.ars.usda.gov/Services/docs.htm?docid=10091 http://web.archive.org/web/20090403101002/http://www.nal.usda.gov/fnic/foodcomp/Data/SR18/reports/sr18fg14.pdf.*

International Search Report, PCT/EP2010/056005, mailed Jul. 12, 2010.

U.S. Appl. No. 13/319,057, filed Nov. 14, 2011.

U.S. Appl. No. 13/319,041, filed Nov. 14, 2011.

International Search Report, EP2010056043, mailed Jul. 12, 2010.

International Search Report, EP2010056002, mailed Jul. 12, 2010.

U.S. Appl. No. 13/319,041, Non Final Office Action, dated Sep. 12, 2013.

* cited by examiner

CAPSULE FOR PREPARING A NUTRITIONAL PRODUCT INCLUDING A FILTER

CROSS REFERENCE TO RELATED APPLICATIONS

The present application is a National Stage of International Application No. PCT/EP2010/056005, filed on May 4, 2010, which claims priority to European Patent Application No. 09159373.1, filed on May 5, 2009 and European Patent Application No. 09162485.8, filed on Jun. 11, 2009, the entire contents of which are being incorporated herein by reference.

BACKGROUND

The present invention relates to a capsule for hygienically preparing a nutritional product containing nutritional ingredients by mixing the ingredients with a liquid; the capsule containing a filter filtering the liquid supplied in the capsule for removing undesired components contained in the liquid. The invention more particularly relates to a capsule for insertion in a device for supplying liquid in the capsule for preparing a nutritional product by mixing with the nutritional ingredients such as an infant formula, growing-up formula or adult nutrition formula. The invention also relates to a method using such capsule.

Nutritional compositions can be, for instance, infant formulas or also nutritional liquids for toddlers, invalids, elderly people, persons having nutritional deficiencies or athletes. These compositions are prepared from ingredients contained in a capsule by addition of a liquid such as water. The liquid may contain undesired contaminants such as micro-organisms or solid particles (e.g., dust, minerals, organic residues, etc.). These undesired contaminants should be removed from the liquid before the liquid is mixed with the ingredients.

Therefore, there is a need for a capsule which enables preparation of nutritional composition for instance an infant formula or other food compositions in a convenient and safe manner.

WO2006/077259 discloses a method for preparing a single serving of a nutritional composition comprising introducing liquid such as water into a cartridge containing a unit dose of the composition in concentrated form. Thereby, the water is treated prior to the introduction into the cartridge in order to remove pathogens from the water. This treatment may be for instance a pre-heating, a filtering or an irradiation of the water with ultra-violet light.

WO 2008/012314 relates to a device which teaches the principle of treating water by means of a filter used for the preparation of nutritional compositions from a capsule inserted in a dispenser.

A capsule with an integrated antimicrobial filter has been described in WO 2009/092629 and No. 09156782.6 filed on 31 Mar. 2009.

SUMMARY OF THE INVENTION

An approach consists in covering the compartment containing the ingredients with the filter. One problem is that a large filter surface tends to deforms under the pressure of liquid added to the sealing pressure of the capsule against the liquid supply device (i.e., the beverage making appliance). Since the filter is placed above the compartment, the support of the filter is difficult to realize or requires a relatively thick and rigid plastic elements under the filter. Therefore, the impact on the cost is high because the filter material, typically, an antimicrobial membrane such PES (polyethersulfone) as well as the plastic material, dramatically increases the overall price of the capsule and render the business model non-viable. Furthermore, the impact on environment is higher because of this excess of packaging and filter material.

Therefore, there is a need for proposing another solution which is simpler, more economical solution, in particular, requiring less packaging and filter material while still offering a suitable technical filtering solution.

Another requirement is to ensure the release of the dedicated amount of the nutritional composition contained in the capsule to ensure a complete feed for each capsule, e.g., to the baby or child. No significant amount of nutritional liquid should be left in the capsule, most preferably, the capsule should be emptied from any liquid and solids. For this, the filter in the capsule can create a too high resistance to the pressurized gas (e.g., air) injected in the capsule during the emptying operation. As a result, the pressure of gas can be insufficient to properly empty the capsule or a too high pressure of gas is required which has an impact on the complexity and cost of the system.

Another requirement is to ensure that there is no contact between the gas opening device for the gas purge and contaminated liquid, e.g., nutritional ingredients or liquid, which would otherwise require systematic cleaning and so a clean-in-place system which would render the device more complex.

Another requirement is to lower the risk of perforating the filter by pressure of gas during the gas purge of the capsule that would provide contamination of the delivered nutritional product/composition.

Another requirement is to ensure that the filter can support the deformation under the pressure of liquid supplied in the capsule, in particular, the pressure at the upstream surface of filter.

One or more of the above-referenced problems are solved by the appended claims.

For this, the invention relates to a capsule for the preparation of a nutritional product in a device adapted to supply liquid in the capsule, said capsule comprising:

at least one compartment containing nutritional ingredients for the preparation of the nutritional product in combination with the supplied liquid, a filter adapted for removing contaminants contained in the liquid, wherein the filter has a filtering surface smaller than the cross section of the mouth of the compartment.

Preferably, at least a part of the filtering surface of the filter is offset relative to the cross section of the mouth of the compartment when viewed in the axial projection of the capsule.

The approach of the invention essentially lies in reducing the surface of the filter and displacing it away from the centre of the capsule to ensure less deformation both by the pressing/sealing forces and the liquid forces exerting themselves on the filter. This configuration also result in a lower consumption of packaging and filter material and consequently a reduced cost and reduced impact on environment.

Preferably, more than 50% of the filtering surface of the filter is placed outside the cross section of the mouth of the compartment when viewed in the axial projection of the capsule.

Most preferably, the liquid filtering surface of the filter is placed fully outside the cross section of the compartment when viewed in the axial projection of the capsule.

Preferably, the filtering surface of the filter is at least two times smaller than the larger cross section of the compartment. The cross section of the compartment is here meant to be the cross section in the transversal plane of the capsule. Most preferably, the cross section is three or more times less than the larger cross section of the compartment.

The filter is preferably placed in a filter-receiving seat which has a smaller depth than the depth of the compartment. The advantage is that the filter can be better clamped and supported in the liquid supply device, in particular from beneath, and consequently it support less effort and flexes less under the liquid load under pressure.

The filter receiving seat preferably forms a lateral extension of the capsule comprising a flange-like rim for cooperating with the liquid supply device which extends beyond the flange-like rim bordering the compartment. Again, these characteristics aim at providing a capsule design wherein the force bearing surfaces exerting on the capsule are moved away from the ingredients' compartment. In particular, the flange-like rim of the filter receiving seat merges on the same plane with the flange-like rim bordering the compartment.

The filter preferably comprises a microporous filter membrane having a typical microfiltration membrane pore size (i.e., pore sizes below 0.4 microns). The material for the membrane can be chosen from the list consisting of PES (polyethersulfone), cellulose acetate, cellulose nitrate, polyamide and combination thereof. The membrane may be formed of a porous layer and/or micro-fibres. For antimicrobial purpose the filter preferably has a pores size of less than 0.2 microns. It may have a thickness of less than 500 microns, preferably comprised between 100 and 300 microns. More than one membrane can be used in series with the same or different pore sizes and/or thicknesses. The membrane has preferably a longer dimension comprised between 8 mm and 40 mm, more preferably between 10 and 30 mm. The filter membrane is preferably a circular, squared, a rectangular or polygonal membrane.

The filter membrane is supported by an outlet wall in which is provided at least one conduit terminating by an injection nozzle directed towards the compartment. The conduit and nozzle aim at refocusing the filtered liquid in a privileged direction inside the compartment. The direction can be either normal or inclined relative to the top plane of the capsule.

The filter comprises an inlet wall comprising a liquid inlet of smaller cross section than the filtering surface of the filter membrane. The inlet wall is sufficiently rigid for proposing a pressing surface for a relative sealing pressure engagement against of the liquid supply means of the external device.

In the preferred mode, the filter is formed as a relatively rigid filter unit comprising a flexible microporous membrane inserted in a pressure resistant, handleable, relatively rigid apertured casing. Hence, the casing protects the membrane against the shocks, pressure, scratching, bending, etc., both during manufacturing of the capsule and during beverage preparation.

The casing can be formed of two half-casings which are welded together, which pinch and/or weld the filter at its circumference. The two half-casings can be associated by clipping and/or ultrasonic welding. These elements are sufficiently rigid to resist bending under the pressure of liquid injected in the capsule. These elements are made of foodgrade polymer such as PP, PA, PE, PA/PP, PVC, PS, PEEK, PLA or starch-based material and combinations thereof.

Preferably, the microporous filter membrane is supported by a structure in relief such as a plurality of ridges/studs protruding from the outlet wall and/or a grid placed between the outlet wall and the filter membrane. This relief structure ensures a minimal deflection of the filter membrane under the pressure of liquid and also enables collection of the liquid at the downstream side of the filter to an outlet of the casing to be supplied in the compartment.

The filter unit also comprises an outlet nozzle extending from the offcentred filter-receiving seat towards and above the first compartment. The outlet nozzle comprises one or at least a limited number of small-diameter outlets for providing a high-momentum jet of liquid in the compartment. Preferably, the nozzle comprises a single outlet having a diameter of less 1.0 mm, most preferably between 0.2 and 0.7 mm. In a variant, two parallel or non-parallel outlets are provided in the nozzle. The outlet is capable of providing a jet of liquid with a flow velocity comprised between 1 and 20 m/sec. The jet created by the nozzle produces a turbulent flow in the compartment which is effective for dissolving and/or dispersing all the ingredients in the liquid.

The capsule further comprises a selectively openable gas inlet which is placed in bypass of the filter to allow gas introduction from the exterior of the capsule into the compartment without passing through the filter. As a result, the filter membrane does not create a pressure loss for the gas before the ingredient's compartment. More preferably, the openable gas inlet is formed in the filter unit, e.g., through the inlet wall, and communicates with the outlet nozzle. The gas inlet enables introduction of gas for emptying the capsule from liquid and so ensuring that the full content of the capsule is well delivered from the capsule. The gas inlet can be opened by piercing or breaking a part of the capsule. When the gas inlet is placed in communication with the filtered side of the filter unit, i.e., conduit leading to the nozzle, it is assured that the opening member pertaining to the liquid supply device for opening the gas inlet comes in contact only with filtered liquid.

The nutritional ingredients are under the form of a liquid concentrate, a paste, a gel or powder. In a preferred mode, the ingredients form an infant formula.

The appended drawings are given as a matter of illustration of the best modes.

DETAILED DESCRIPTION OF THE PREFERRED EMBODIMENTS

Figure 1:
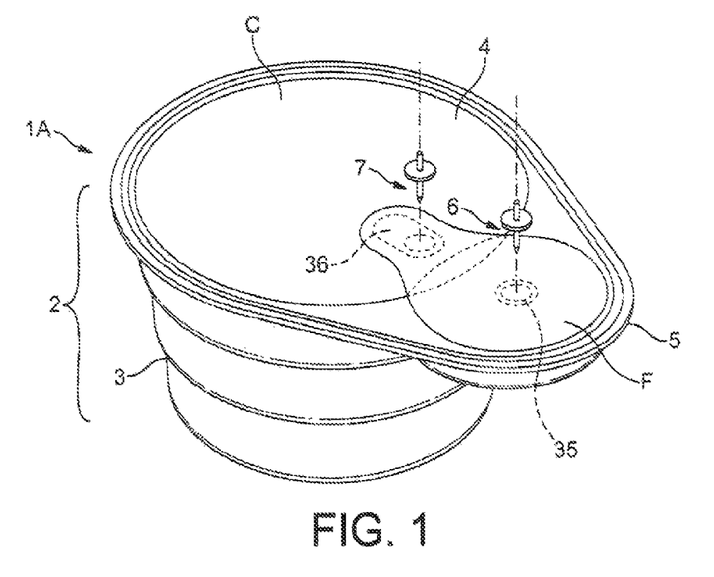
FIG. 1 is a perspective top view of a capsule according to preferred mode of the invention.
Figure 2:
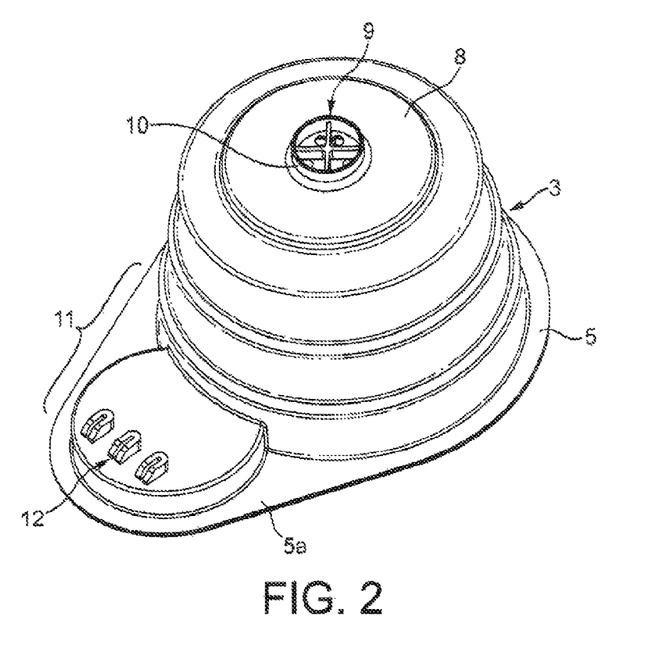
FIG. 2 is a perspective bottom view of the capsule of FIG. 1.
Figure 3:
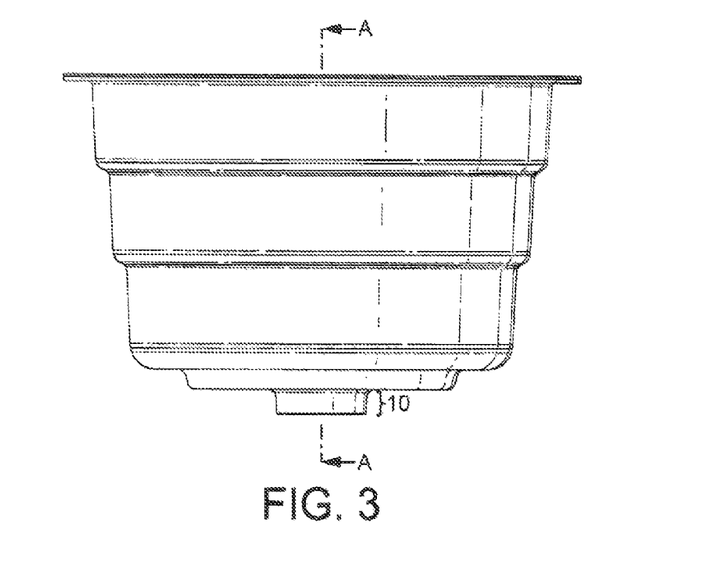
FIG. 3 is a side view of the capsule of FIG. 1.

The general aspect of the capsule according to a first mode of the invention is illustrated in connection with FIGS. 1 to 3 given as a preferred example only. The capsule 1A generally comprises a body 2 for receiving nutritional ingredients, a filter technology and a product delivery technology as will be discussed later on. The capsule has a cup 3 formed in the body which is closed by a liquid impermeable top membrane or foil 4 which is sealed onto the flange like rim 5 of the body. The membrane 4 may be simply liquid impervious or, most preferably, liquid and gas impervious. In particular, the membrane can be a multilayer comprising a gas barrier such as EVOH and/or aluminium. As will be explained in more detail later on, the top membrane is made of a puncturable material such as thin polymer and/or aluminium to enable liquid to be supplied by means of a liquid injector 6 on one hand, and gas to be supplied in the capsule by means of a gas injector 7 on the other hand.

The bottom 8 of the cup 3 comprises a product outlet 9 intended for the release of the liquid nutritional composition/product from the capsule. The product outlet 9 may comprise one or several openings for streaming of the liquid composition towards a receptacle such as a baby bottle, glass or cup. The product outlet 9 may extend from the cup bottom by a short duct 10 for directing the flow of liquid and reducing side projections of liquid which could contaminate the surroundings of the receptacle.

The body of the capsule extends on the upper side by an extension portion 11 which receives the filter for filtering liquid supplied to the capsule. As illustrated on FIG. 2, the capsule may further comprises a three-dimensional coding structure 12 capable of co-acting with positioning sensors of the liquid supply device, for discriminating the type of the capsule inserted in the device so that the preparation cycle may be tailored to the recognized capsule type, e.g., by supplying the proper volume of liquid, varying temperature, flow rate, etc.

Figure 4:
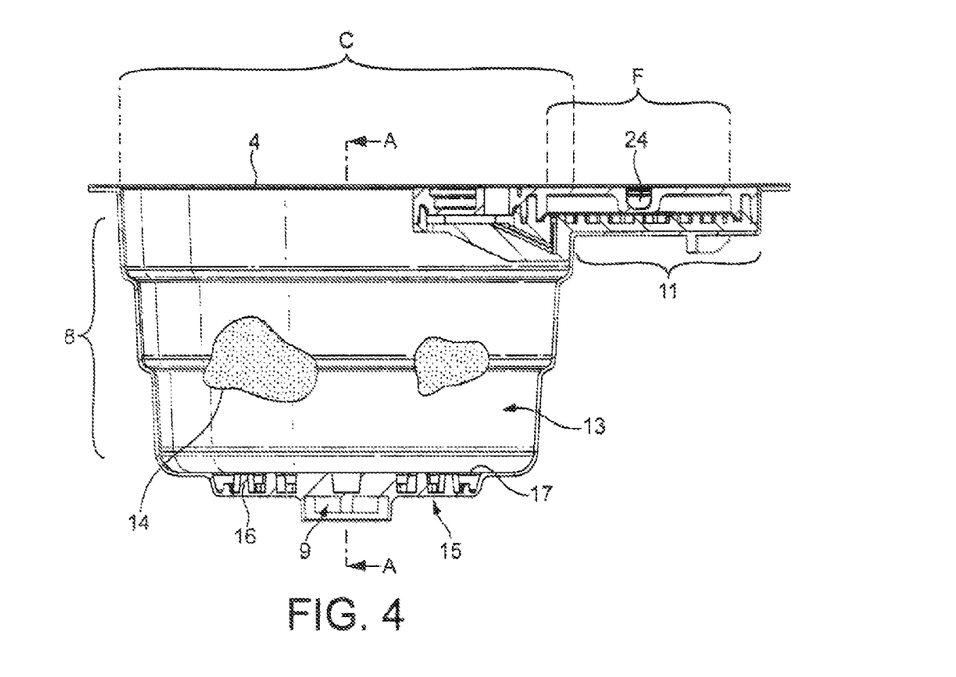
FIG. 4 is cross section of the capsule of FIG. 3 along line A.
Figure 5:
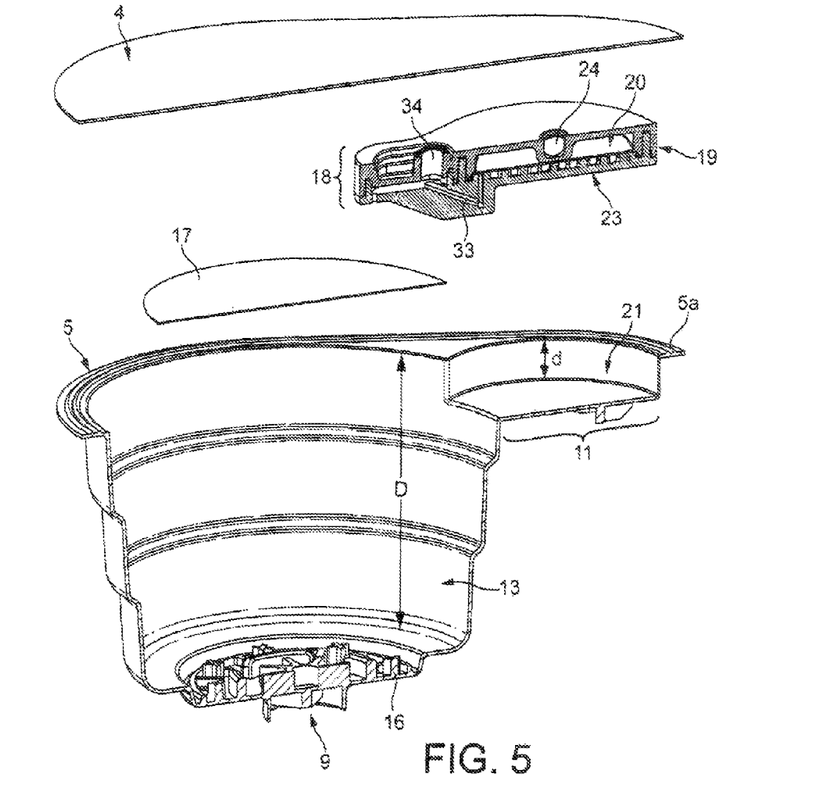
FIG. 5 is an exploded cross sectional view of the capsule of FIG. 1 showing the different elements before assembly.

In view of FIGS. 4 and 5, the capsule comprises, in the cup, a compartment 13 containing nutritional ingredients 14 formed by the bottom and sidewall of the cup 3. The volume of the compartment may vary depending on the volume of liquid to be injected in. In general, a large volume is preferred for large volume of liquid so that the compartment serves as a mixing bowl for the ingredients and liquid to form the composition.

The capsule may comprise a product delivery system 15 for ensuring a proper interaction of the supplied liquid and the ingredients contained in the compartment of the capsule and for reducing, preferably avoiding, contact of nutritional liquid with the device. In a particular mode, the product delivery system is designed to open at least one orifice through the capsule for delivery of the composition when a sufficient pressure of liquid has been reached in the compartment. For this, the bottom 8 of the cup comprises perforating elements 16 strategically placed to perforate a lower membrane 17 normally separating the compartment 13 from the liquid product outlet 9. The lower membrane is typically a thin liquid-tight perforable membrane made of aluminium and/or polymer. The membrane is sealed at the bottom edge of the cup. For instance, the membrane is a 30-micron foil of aluminium. A capsule comprising such a product delivery system is described in PCT/EP09/053033 filed on 16 Mar. 2009 which is incorporated here by reference. It should be noted that the product delivery system can be designed differently. For instance, it can be a simple valve comprising an orifice or slot normally closed and which opens under the pressure which builds in the compartment as resulting from the liquid being supplied in. In another alternative, it can also be a porous wall forming a product filter.

The capsule of the invention is further designed to ensure filtration of the liquid being supplied in the compartment. The rationale for filtration of incoming liquid is essentially linked to the requirement for controlling a perfect quality of the liquid, e.g., water, entering in the delivered composition. Water can be supplied at a temperature of service, e.g., at about 35-40 degrees Celsius, by heating of ambient water coming from a water tank of the fluid supply device. More preferably, the filtration is carried out to remove contaminants including microorganisms such as bacteria, yeast or molds and eventually viruses, e.g., which have not been destroyed by the water heating operation. For this, a solution can consists in inserting, in a predetermined area of the capsule, a filter unit 18 in the form of a pressure resistant, handleable unit comprising an outer protective casing 19 and at least one filter media, in particular, a filter membrane 20. The filter unit 18 is preferably rigid in the sense that it is more rigid than the filter membrane and preferably, it is also resistant to significant deflection upon application of the liquid and sealing pressure exerted by the liquid coming out of the injector and by the sealing engagement of the fluid supply device itself onto the capsule. The filter unit presents the advantage to facilitate the placing of the filter technology in the capsule, without requiring specific connection means, and it reduces the risk of damaging the filter membrane.

For antimicrobial purpose, the filter membrane has preferably a pore size of less than 0.4 microns, most preferably of less than 0.2 microns. It may have a thickness of less than 500 microns, preferably between 10 and 300 microns. The material of the membrane can be chosen from the list consisting of PES (polyethersulfone), cellulose acetate, cellulose nitrate, polyamide and combinations thereof.

In particular, the filter unit is insertable in a filter receiving seat 21 formed at the extension portion 11 of the body. The filter receiving seat is so designed to position the filter unit in an offcentred manner relative to the compartment. As a result, the deformation of the capsule due to the pressure of liquid and the sealing with the device can be reduced compared to a more central positioning above the compartment. The filter receiving seat 21 may be, for instance, a U-shaped cavity of relatively low depth (d) compared to the depth (D) of the compartment. The seat 21 has a bottom wall and a sidewall matching at least part of the bottom and sidewall of the filter unit, in particular, of its larger portion 27. The filter unit may not require any specific connection with the filter receiving seat but it is simply maintained in place by the complementary shapes of the unit, e.g., by press-fitting, in the seat and the closure obtained by the top membrane 4. For instance, the seat 21 may comprise corrugations or recesses in its sidewall, e.g., near the compartment, for receiving the filter unit by press-fitting (not shown).

As illustrated in FIG. 4, the filter unit 18 is sized so that its filtering surface (F) is at least two times, preferably several times smaller than the larger cross section (C) of the mouth (i.e., upper opening) of the compartment 13. Furthermore, the largest portion of filtering surface (F) is axially offset relative to the cross section (C) of the compartment (13) when the capsule is viewed in projection view along axial line A. By "largest portion", it is meant that at least 60%, preferably 85% of the filtering surface is placed outside the cross section of the compartment in the projection along direction A. The filtering surface is here considered as the total surface of the filter membrane minus its pinched circumference 30. A certain overlap of the surfaces may be considered as acceptable. A first problem solved is the reduction of the compartment and the ability to better control the deformation of the filter. Another problem solved is about the reduction of the amount of material for the filter membrane and consequently the reduction of the manufacturing cost and the impact of the used capsule on environment. Another advantage is the possibility to compress the capsule, in particular, the cup of the capsule after emptying for reducing the storage volume of the used capsules. For this, the capsule may be provided with a sidewall including weakened lines to promote compression of the cup in the axial direction.

As illustrated in FIGS. 6 to 9, the filter unit of the invention comprises an inlet wall 22 for introduction of liquid in the unit and an outlet wall 23 for delivery of filtered liquid in the compartment 13. The inlet wall comprises a liquid inlet 24 whereas the outlet wall comprises a liquid outlet 25 formed at a nozzle 26 of the unit. The liquid inlet and outlets 24, 25 are spaced apart in the axial direction so that liquid inlet 24 is placed outside the contour of the compartment 13 whereas the outlet 25 is placed inside the contour of the compartment. As a matter of preferred design, the filter casing can take the form of a racket with a larger portion 27 positioned in the seat and extending by a narrowing portion 28 of nozzle which extends transversally above the compartment. The outlet 25 preferably has a small diameter, e.g., between 0.2 and than 1.5 mm, to form a jet of liquid under pressure that promotes dissolution and/or dispersion of the ingredients by liquid projected through the nozzle. The outlet may be formed of several discrete openings. The number of openings should be small, preferably between 1 and 5 at maximum to avoid a too large reduction of the flow velocity. The flow velocity through the outlet of the nozzle is preferably comprised between 1 and 20 m/sec. The outlet can have different cross section such as circular, oval, rectangular, etc.

The casing encloses the filter membrane 20 in an inner compartment 29 forming an upstream side and downstream side with the circumference 30 of the filter being sealed by the casing in a liquid-tight manner so to avoid bypass of the filter by liquid. At the downstream side of the compartment, the filter membrane is further supported by a support structure formed, e.g., of a multitude of small studs 31. The studs have flat free ends to reduce axial deflection of the filter membrane under pressure and avoid its breakage. The studs are preferably formed along the whole cross section of the filter membrane. More preferably, adjacent studs are not distanced of more than 2.5 mm. Between the support structure is formed a multitude of channels 32 for collecting the liquid being filtered through the membrane. The outlet wall 23 comprises at least one outlet conduit 33 for making fluid communication between the downstream side of the filter membrane, via channels 32, and the outlet 25 of nozzle 26. The support structure can be a separate element, e.g., a grid placed in the casing below the filter.

Figure 6:
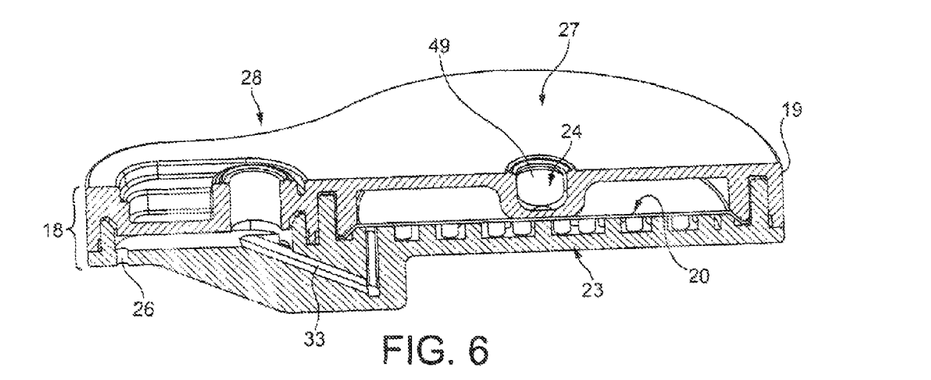
FIG. 6 is an enlarged perspective and cross sectional view of the filter unit of the capsule of FIG. 1.

At the inlet wall 22, the filter unit further comprises a gas inlet 34 for enabling supply of gas under pressure, e.g., compressed air, in the compartment 13. The gas inlet can be, as illustrated, an opening through the wall intersecting with the outlet conduit 33. Therefore, it should be noted that gas entering the unit will bypass the filter membrane 20 on its way to the nozzle 26 and will enter under pressure the compartment. Both the liquid inlet 24 and the gas inlet 34 are closed by the top membrane 4. Hence, the inlets are selectively openable by perforating the membrane 4 at the dedicated inlets. In particular, the top membrane 4 is sealed around the liquid inlet and gas inlet by seals 35, 36 (FIG. 1). Therefore, when the top membrane is perforated by the gas injector 7 of the fluid supply device, the tip of the perforator can only enter in contact with filtered liquid. As a result, there is a much lower chance of contamination of the perforator than if the gas and liquid inlet were the same entry. The gas perforator can so remain clean for the next preparation cycle.

Figure 7:
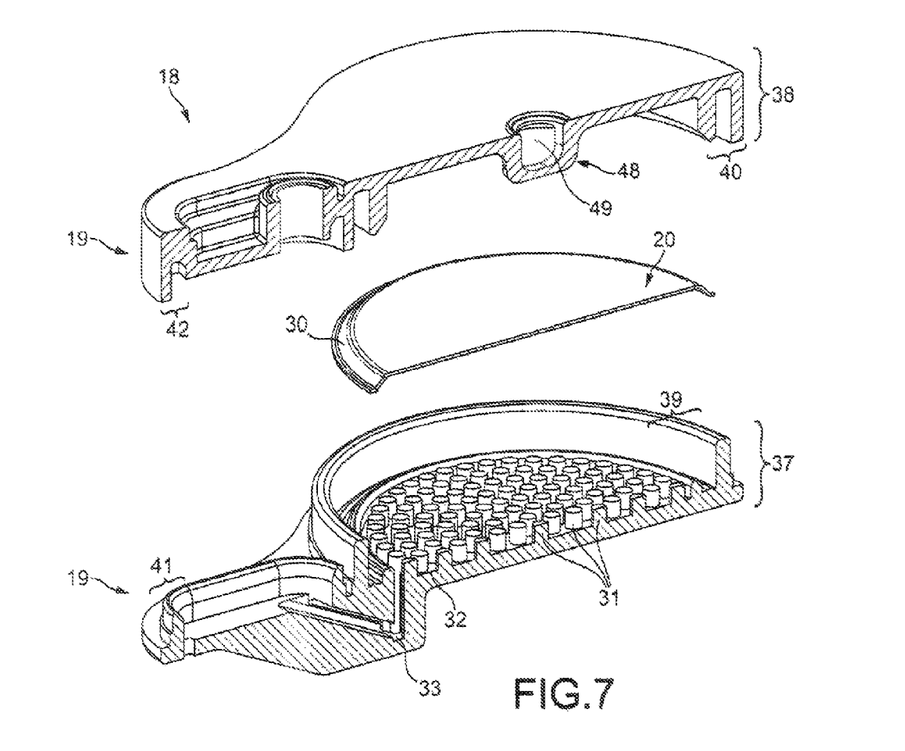
FIG. 7 is an exploded view of the filter unit of FIG. 6.

The structure of the filter casing 19 can vary. However, in a preferred design, the casing is formed of two parts 37, 38 which are welded and/or clipped together. FIG. 7 shows the filter unit 18 with a lower half casing 37 and an upper half casing 38. The lower half casing 37 has a protruding circular ridge/groove section 39 which delimits the contour of the inner compartment for fitting in a circular groove/ridge section 40 of the upper half casing 38. Similarly, the nozzle portion 28 of the unit is assembled by a second ridge/recess section 41 in the lower half casing that fits into a groove/ridge section 42 of the upper half casing 38. It could be as well that sections 39, 41, respectively 40, 42 form continuous sections from the larger portion 27 of the racket to the narrowing portion 28 of the racket.

Figure 10:
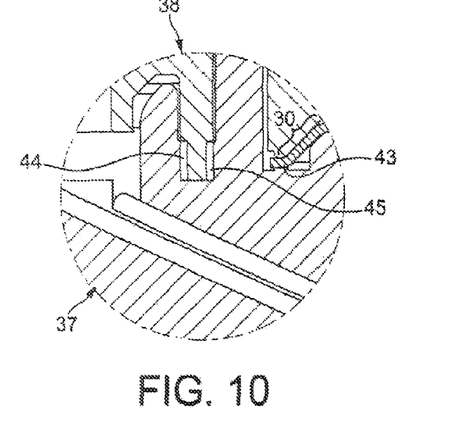
FIG. 10 is a detail in cross section of the welded assembly of the filter unit of FIG. 6.
Figure 11:
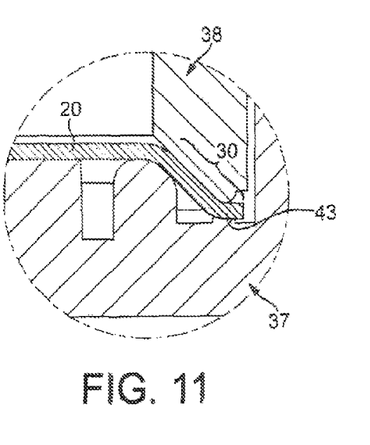
FIG. 11 is another detail in cross section of the filter membrane connection in the casing of the filter unit.

As illustrated in FIGS. 10 and 11, the lower and upper half casings 37, 38 are assembled while pinching the circumference 30 of the filter membrane. The parts 37, 38 can be designed in such a way to bend the circumference and pinch it at a circular point 43. The filter might not be necessary welded to the casing if the pinch point is sufficient to maintain the filter firmly in place and therefore successfully avoid bypass effect during operation. The unit can thus be assembled by welding at the groove/ridge sections by suitable welding lines 44, 45 for instance. The benefit of welding the casing parts but pinching the filter resides in the possibility to choose amongst a larger material choice for the filter without having to care for welding compatibility with the material of the casing. Another benefit is to simplify assembly by using ultrasonic welding for the thicker elements of the unit and avoid damaging the thinner element (i.e., filter membrane).

Figure 8:
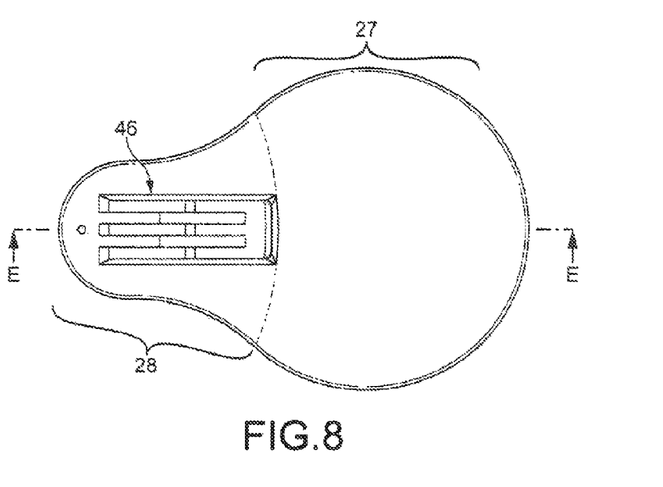
FIG. 8 is a bottom plane view of the filter unit of FIG. 6.
Figure 9:
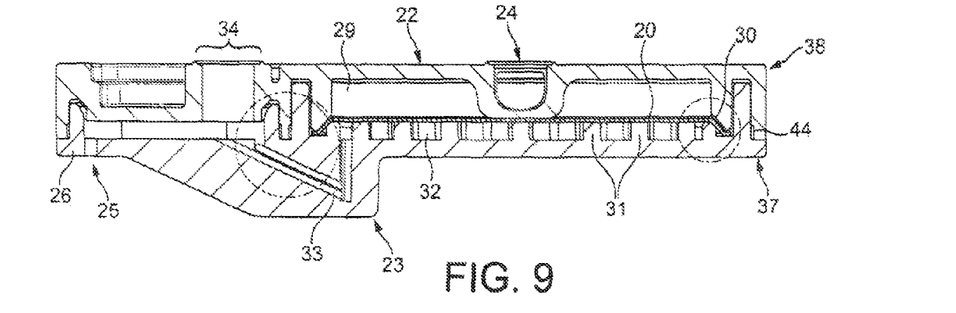
FIG. 9 is an enlarged plane cross sectional view of the filter unit of FIG. 8 along line E.

As shown in FIG. 8, the structure of the filter unit may be optimized. For example, the filter unit can comprise a reinforcing structure 46, in particular, at the narrowing portion 28 to enable the conduit to be formed in the lower wall but while still maintaining rigidity of the unit, in particular, in view of fluidic and mechanical constraints. For instance, the reinforcing structure forms a series of ribs extending, for instance, in the transversal direction of the racket. Of course, many different reinforcing patterns are possible. In particular, the ratio rigidity-to-weight should be optimized to promote cost reduction and lower impact on environment.

Figure 12:
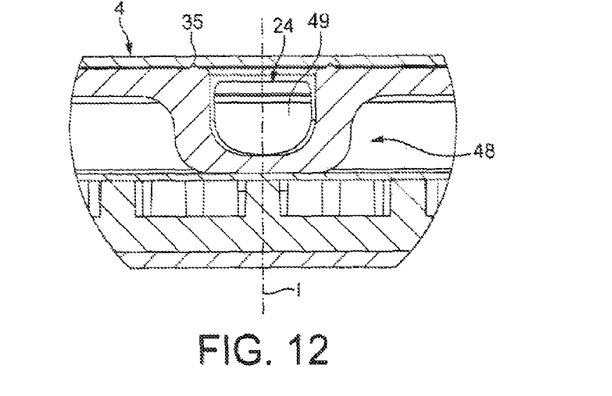
FIG. 12 shows another detail in cross section of the inlet of the filter unit.

In order to reduce the risk of damaging the filter membrane during opening of the liquid inlet 24 when perforating the membrane 4 in the area 47 just above the inlet, as illustrated in FIG. 12, a perforation-resistant deflector 48 is provided between the inlet and the filter membrane 20. The deflector 48 can be made integral with the inlet wall of the casing. It can be designed as a transversal bridge crossing the inlet opening and inset relative to the opening. Therefore liquid may pass by side passages 49 formed in the inlet between the bridge and the wall. Of course, the deflector could take various forms provided it creates a protection against perforation along inlet axial direction I. The deflector could also be a separate piece interposed between the filter and the inlet wall.

Figure 13:
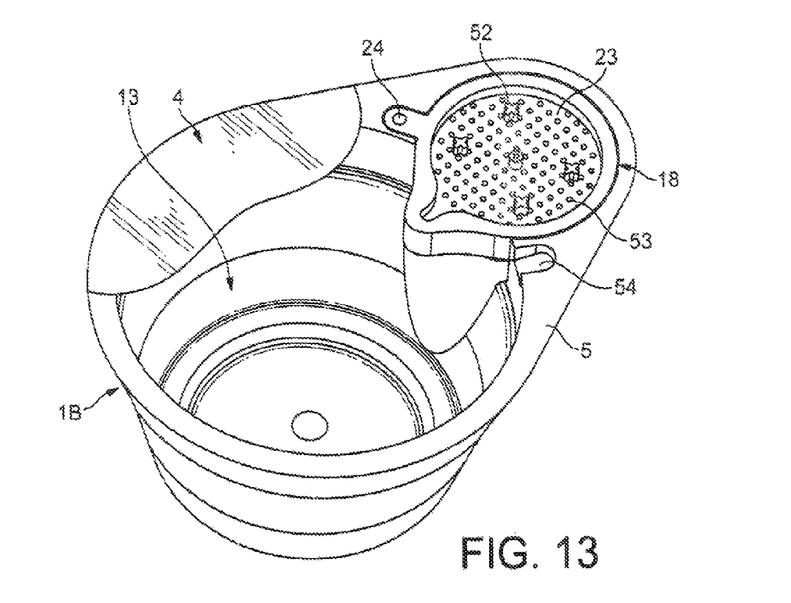
FIG. 13 shows, in top perspective view, a second embodiment of the capsule of the present invention with the top membrane being removed for clarity.
Figure 14:
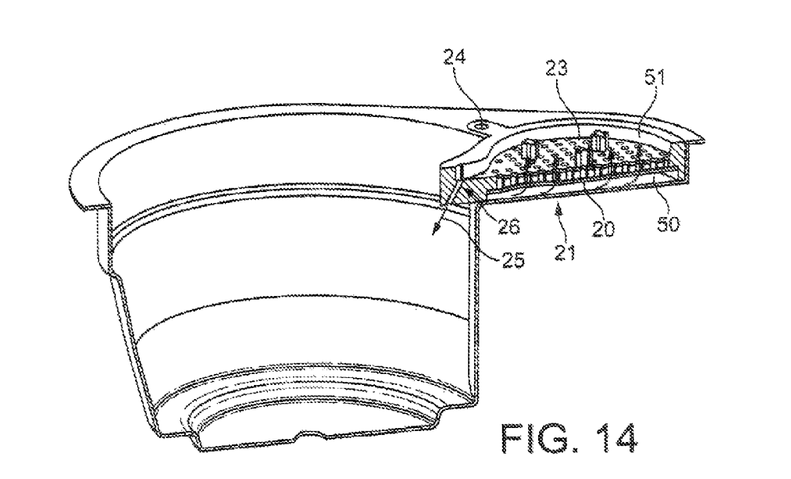
FIG. 14 shows in cross section perspective view the capsule of FIG. 13.

In another embodiment illustrated in FIGS. 13 and 14, the capsule 1B of the invention differs in different aspects. First of all, a filter unit 18 is provided which comprises an outlet wall 23 onto which is applied the filter membrane 20. Contrary to the previous embodiment, the filter membrane 20 is placed between the outlet wall 23 and the bottom of the filter receiving seat 21 of the body. A liquid inlet 24 is provided on the side of the unit which communicates with the lower compartment 50 placed upstream of the filter but below the outlet wall 23. A second upper compartment 51 is formed between the outlet wall 23 and the top membrane (not shown) 4 which is sealed on the flange-like rim 5 of the body of the capsule. In order to avoid the top membrane 4 from collapsing in the upper compartment 51 and partially blocking the flow coming out of the filter membrane, the outlet wall 23 of the filter is provided with several support elements 52. The outlet wall is further provided with a multitude of openings 53 for allowing filtered liquid to properly distribute through the filter membrane placed upstream. Therefore, the liquid supplied in the capsule through liquid inlet 24 flows under the unit in the lower compartment 50 then through the filter membrane 20 in the upward direction. The filtered liquid is thus collected in the upper compartment and flows through the outlet nozzle 26 comprising a small-size outlet 25. For emptying capsule 1B, a gas inlet can be provided independently from the filter unit. In particular, an indentation 54 can be formed in the flange like rim, e.g., beside the filter unit. For gas to be supplied in the ingredients compartment 13, the top membrane is perforated at the site of the indentation. Perforation of the membrane can be carried out by a mechanical element of the fluid supply device or by gas under pressure. Of course, the gas inlet could also be provided in the filter unit. The product delivery system can be the same as described in the first mode.

The description will now be focused, in relation to FIGS. 15 to 20, on the fluid supply device according to the invention adapted for receiving a capsule for preparation of a nutritional composition as described.

Figure 15:
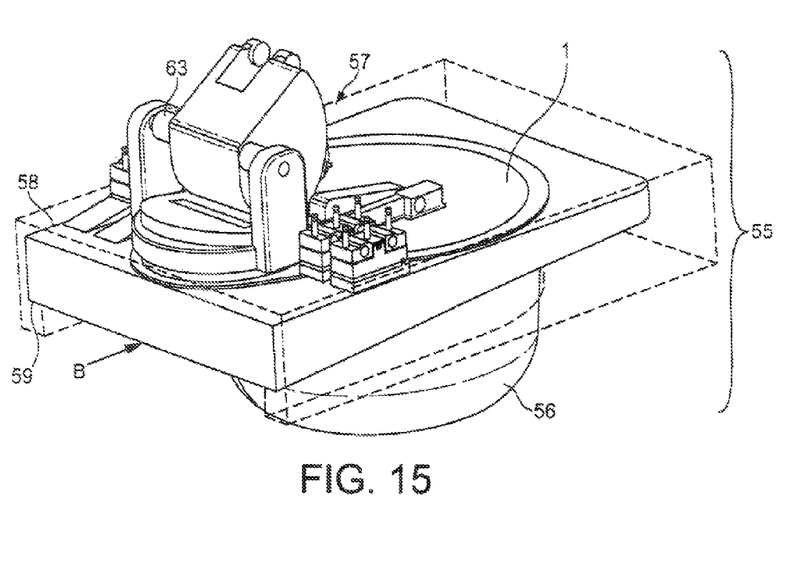
FIG. 15 shows a perspective view of a fluid supply device of the invention in which is inserted a capsule of the invention before opening of the liquid inlet for supply of liquid in the capsule.
Figure 16:
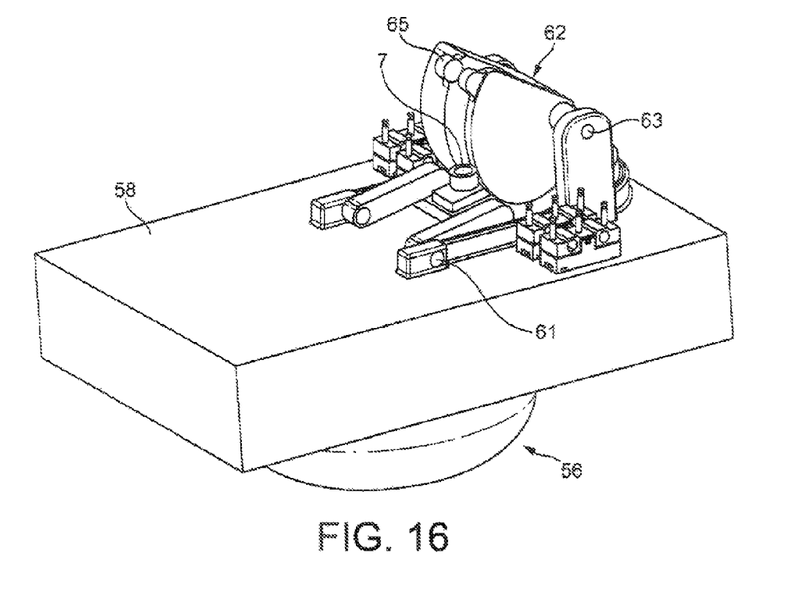
FIG. 16 shows a perspective view from a different angle of the fluid supply device of the invention still before opening of the liquid inlet.

The fluid supply device 55 of the invention typically comprises a capsule holder 56 adapted in size to receive the capsule 1. The capsule holder fits with a fluid supply group 57 comprising liquid and gas supply means. The fluid supply group 57 comprises a capsule holder insertion base 58 for offering a stable position of reference for the capsule holder. In particular, complementary guiding means 59 on the capsule holder 56 and base 58 are provided for enabling easy assembling and removal of the capsule holder from the base such as along a longitudinal sliding direction B.

It should be noted that the filter unit 18 of the invention could as well be a separate part which is associated with the capsule at the time of use, e.g., during insertion of the capsule in the fluid supply device. For instance, the filter unit can be a part which is associated to the liquid injector or integrated in the liquid injector.

Figure 17:
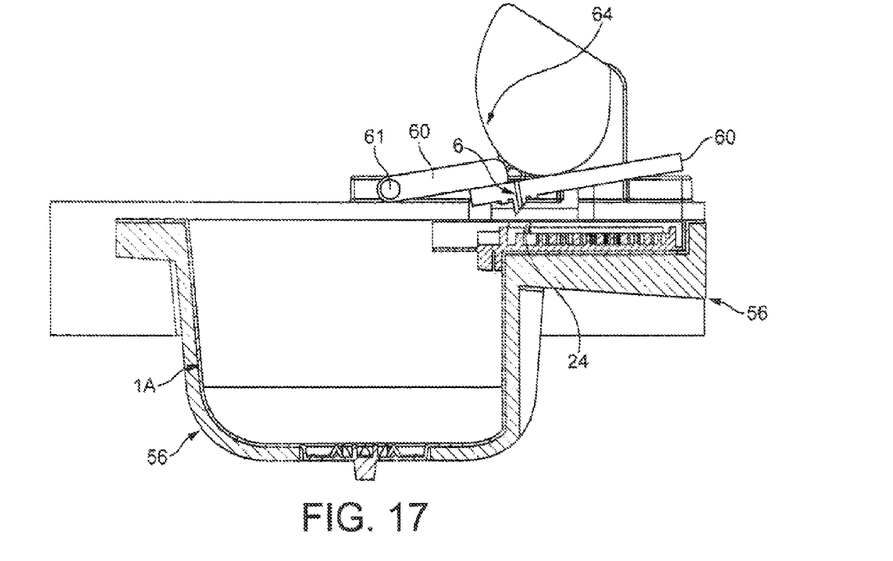
FIG. 17 is a cross sectional view of the device of FIG. 15 along a plane passing through the liquid injector still before opening of the liquid inlet.
Figure 18:
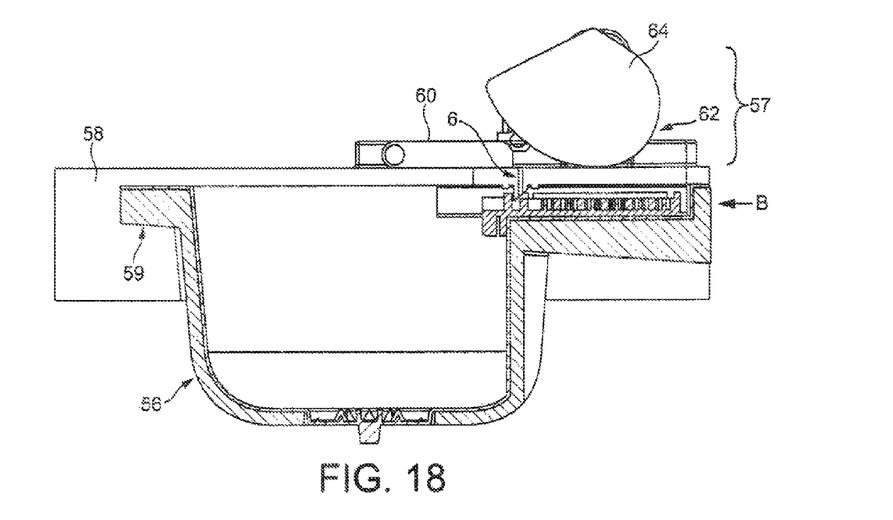
FIG. 18 is a cross sectional view of the device of FIG. 15 along a plane passing through the liquid injector still after opening of the liquid inlet.
Figure 19:
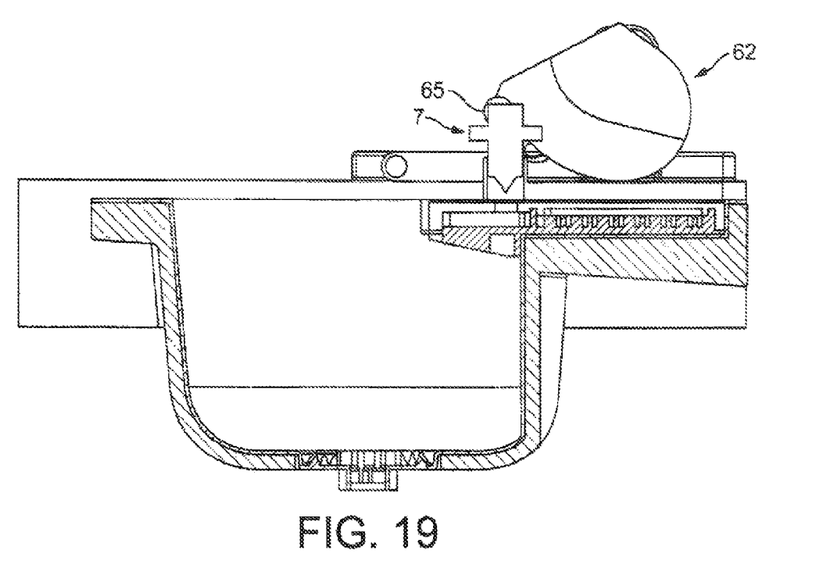
FIG. 19 is a cross sectional view of the device of FIG. 15 along a plane passing through the gas injector before opening of the gas inlet.
Figure 20:
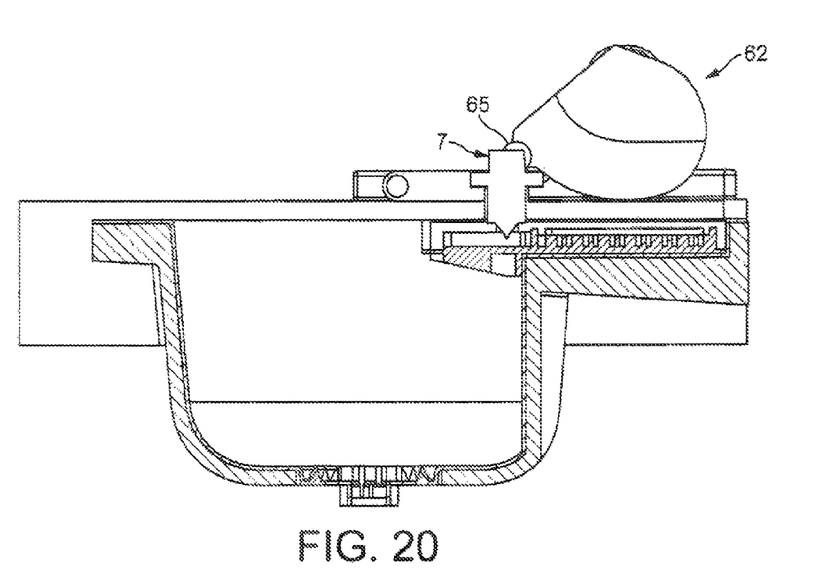
FIG. 20 is a cross sectional view of the device of FIG. 15 along a plane passing through the gas injector after opening of the gas inlet.

The fluid supply group 57 further comprises a liquid injection plate 60 bearing the liquid injector 6 by itself. The liquid injection plate 60 can be positioned to rotate along an axle 61 mounted on the top part of the base 58 such that the plate can take at least a first position at which the injector is placed away from the liquid inlet opening of the capsule and a second position at which the injected is engaged in opening of the liquid inlet 24. The first position is illustrated on FIG. 17 whereas the second position is illustrated in FIG. 18. The injection plate moves from the first position to the second position, and vice versa, by a cam mechanism 62 which is also mounted in rotation along a second axle 63 on the base. Similarly, a gas injector 7 is provided which can take a first position where it maintained away from the gas inlet of the capsule (FIG. 19) and a second position where it is engaged in opening of the gas inlet (FIG. 20). Again the change from first to second position of the gas injector 7 is controlled by the cam mechanism 62. In an advantageous manner, the cam mechanism 62 is common to control both the positions of the liquid and gas injectors in such a manner that the gas injector moves from its first to second position at a time the liquid injector has already moved from first to second position. The cam mechanism 62 in particular comprise at least one first cam portion 64 acting on the injection plate and at least one second cam portion 65 acting on the gas injector. The two cam portions are linked to the same cam mechanism so that they always act on their respective injectors in a coordinated manner. FIGS. 17 and 18 show the first cam portion 64 acting to change the position of the liquid injector 6 by pushing the plate 60. The cam portion 64 forming an eccentric surface relative to axle 63 which pushes the plate 60 downwards in direction of the capsule. It should be noted that sealing means such as an O-ring (not shown) may be associated to the injection plate for locally creating a liquid seal around the liquid inlet. FIGS. 19 and 20 show the second cam portion 65 also forming an eccentric surface pushing on the gas injector 7 in direction of the gas inlet. For clarity, the device does not show all the detail, in particular, the elastic return means for replacing the liquid injection plate in its first position and similar means for replacing the gas injector in its first position. Such elastic return means can be in the form of springs or equivalents.

In a different mode, the filter unit 18 can separate from the capsule and be a disposable part of the fluid supply device.

What is claimed is:

1. Capsule for the preparation of a nutritional product in a device adapted to supply liquid into the capsule, the capsule comprising:

at least one compartment containing nutritional ingredients for the preparation of the nutritional product in combination with the supplied liquid, the at least one compartment having a bottom, a sidewall and a top that defines a mouth for receiving the liquid, a separate filter unit comprising an outer protective casing that contains therein a microporous filter that removes microorganism contaminants contained in the supplied liquid before directing the supplied liquid to the at least one compartment for contact with the nutritional ingredients, and a filtering surface, present as part of the microporous filter, having an entry surface area for receiving the liquid that is supplied to the capsule, wherein the filtering surface is smaller than an area enclosed by the mouth of the at least one compartment of the capsule and at least part of the filtering surface is offset in transverse cross-section relative to the transverse cross-section enclosed by the mouth of the compartment when viewed in a vertically extending axial projection of the capsule and with respect to a horizontal plane that is parallel to the mouth;

the filter unit and filtering surface at least partly extend outside the mouth of the at least one compartment; and a membrane covering the mouth and the filter unit, and sealing the capsule.

2. Capsule according to claim 1, wherein more than 50% of the filtering surface is located outside the mouth of the at least one compartment when viewed in a vertical axial projection of the capsule.

3. Capsule according to claim 1 wherein the entry surface area of the filtering surface is at least two times smaller than an area of a larger cross section of a plane that is transverse to the mouth of the at least one compartment.

4. Capsule according to claim 1, wherein the filter is placed in a filter-receiving seat which has a smaller depth than a depth of the compartment.

5. Capsule according to claim 4, comprising at least one flange-like rim of the filter-receiving seat for cooperating with the device adapted to supply liquid into the capsule, wherein the filter receiving seat extends beyond the flange like rim bordering the compartment as a lateral extension of the capsule.

6. Capsule according to claim 5, wherein the flange-like rim of the filter-receiving seat merges on a same plane with a flange-like rim bordering the compartment.

7. Capsule according to claim 1, wherein the microporous filter comprises a flexible filter membrane.

8. Capsule according to claim 7, wherein the filter membrane is supported by an outlet wall, the outlet wall comprising at least one conduit terminating in an injection nozzle directed towards the compartment.

9. Capsule according to claim 8, wherein the filter comprises an inlet wall comprising a liquid inlet having a smaller cross section, in a plane that is transverse to the capsule, than the filtering surface of the filter membrane.

10. Capsule according to claim 1, wherein the filter unit outer casing is a pressure resistant, handleable, rigid casing.

11. Capsule according to claim 1, wherein the casing is formed of two half-casings which are welded together, and which pinch and/or weld the filter membrane at its circumference.

12. Capsule according to claim 7, wherein the casing includes an outlet wall and the filter membrane is supported by a plurality of ridges/studs protruding from the outlet wall or a grid provided between the outlet wall and the filter membrane.

13. A capsule for the preparation of a nutritional product in a device adapted to supply liquid into the capsule, the capsule comprising:

at least one compartment containing nutritional ingredients for the preparation of the nutritional product in combination with the supplied liquid, the compartment having a mouth for receiving the liquid, with the mouth having a periphery;

a filter-unit receiving seat which has a smaller depth than a depth of the compartment;

a separate filter unit that removes microorganism contaminants contained in the supplied liquid, before directing the liquid to the at least one compartment for contact with the nutritional ingredients, wherein the filter unit is placed within the filter-unit receiving seat, the filter unit comprising:

a flexible microporous membrane present within a handleable pressure-resistant outer casing, an outlet nozzle extending from the filter unit receiving seat towards and above the at least one compartment of the capsule, and a filtering surface, present as part of the microporous membrane, for receiving the liquid that is supplied to the capsule, wherein the filtering surface has an entry surface area that is smaller than the area enclosed by the mouth of the at least one compartment of the capsule, and at least part of the filtering surface is offset in transverse cross-section relative to the transverse cross-section enclosed by the mouth of the compartment when viewed in a vertically extending axial projection of the capsule and with respect to a horizontal plane that is parallel to the mouth;

the filter unit and filtering surface at least partly extend outside the mouth of the at least one compartment, and a membrane covering the mouth and the filter unit, and sealing the capsule.

14. Capsule according to claim 1, comprising a selectively openable gas inlet which is placed in bypass of the filter membrane to allow gas introduction from the exterior of the capsule into the compartment without passing through the filter membrane.

15. Capsule according to claim 1, wherein the nutritional ingredients are in a form selected from the group consisting of a liquid concentrate, a paste, a gel and powder.

16. A capsule for the preparation of a nutritional product in a device adapted to supply liquid into the capsule, the capsule comprising:

at least one compartment containing nutritional ingredients for the preparation of the nutritional product in combination with the supplied liquid, the compartment having a mouth for receiving the liquid, with the mouth having a periphery;

a separate filter unit that removes microorganism contaminants contained in the supplied liquid before directing the liquid to the at least one compartment for contact with the nutritional ingredients, the filter unit comprising:

an outer protective casing that contains therein a microporous filter, an inlet wall for entry of the supplied liquid and an outlet wall for delivery of filtered liquid into at least one compartment of the capsule, and a microporous filter having a filtering surface having an entry surface area that is smaller than the area enclosed by the mouth of at least one compartment of the capsule, and at least part of the filtering surface is offset in transverse cross-section relative to the transverse cross-section enclosed by the mouth of the compartment when viewed in a vertically extending axial projection of the capsule and with respect to a horizontal plane that is parallel to the mouth;

the filter unit and filtering surface at least partly extend outside the mouth of the at least one compartment, and a membrane covering the mouth and the filter unit and sealing the capsule.

* * * * *

UNITED STATES PATENT AND TRADEMARK OFFICE
CERTIFICATE OF CORRECTION

PATENT NO. : 8,703,219 B2
APPLICATION NO. : 13/318981
DATED : April 22, 2014
INVENTOR(S) : Doleac et al.

Page 1 of 1

It is certified that error appears in the above-identified patent and that said Letters Patent is hereby corrected as shown below:

Title Page
Item (56) References Cited, U.S. PATENT DOCUMENTS:
    after "663,271 A", change "4/1900" to -- 12/1900 --.

Item (56) References Cited, FOREIGN PATENT DOCUMENTS:
    after "CN 1826071 A", change "9/2006" to -- 8/2006 --;
    after "EP 1500358 B1", change "09/2007" to -- 1/2005 --;
    change "EP 2194824 61 9/2011" to -- EP 2194824 B1 6/2010 --;
    after "EP 2230973 B1", change "10/2011" to -- 9/2010 --; and
    after "EP 2427065 B1", change "12/2012" to -- 3/2012 --.

Signed and Sealed this
Nineteenth Day of August, 2014

Michelle K. Lee
*Deputy Director of the United States Patent and Trademark Office*